US011333771B2

(12) United States Patent
Schiegg (10) Patent No.: US 11,333,771 B2
(45) Date of Patent: May 17, 2022

(54) METHOD FOR ASCERTAINING A UERE, METHOD FOR DETERMINING A UERE, COMPUTER-IMPLEMENTED DATA STRUCTURE, USE, DEVICE AND COMPUTER-IMPLEMENTED PROGRAM (71) Applicant: Robert Bosch GmbH, Stuttgart (DE)

(72) Inventor: Florian Alexander Schiegg, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 16/721,299

(22) Filed: Dec. 19, 2019

(65) Prior Publication Data
US 2020/0200917 A1  Jun. 25, 2020

(30) Foreign Application Priority Data

Dec. 20, 2018  (DE) .......................... 102018222643.1

(51) Int. Cl.
*G01S 19/40* (2010.01)
(52) U.S. Cl.
CPC ................... *G01S 19/40* (2013.01)
(58) Field of Classification Search
CPC .......... G01S 19/40; G01S 19/42; G01S 19/48; G01S 19/09; G01S 19/05
USPC .................................................... 342/357.23
See application file for complete search history.

(56) References Cited

U.S. PATENT DOCUMENTS

| 5,978,735 A | 11/1999 | Gu |
| 6,211,817 B1 | 4/2001 | Eschenbach |
| 6,397,147 B1 | 5/2002 | Whitehead |
| 2004/0225432 A1 | 11/2004 | Pilley et al. |
| 2005/0010364 A1 | 1/2005 | Moser et al. |
| 2013/0021199 A1 | 1/2013 | Fix et al. |
| 2017/0074659 A1 | 3/2017 | Giurgiu et al. |
| 2018/0188039 A1* | 7/2018 | Chen ..................... B60W 40/06 |
| 2018/0216942 A1* | 8/2018 | Wang ...................... G01S 17/89 |

(Continued)

FOREIGN PATENT DOCUMENTS

| KR | 20030037891 A | 5/2003 |
| KR | 101607082 B1 | 4/2016 |
| WO | 9518978 A1 | 7/1995 |

(Continued)

OTHER PUBLICATIONS

Werner, et al.: "Development and Early Results of a GALILEO UERE/UERRE Monitoring Facility", Proceedings of the 22nd International Meeting of the Satellite Division of the Institute of Navigation (ION GNSS 2009), Sep. 22-25, 2009, Savannah, GA, USA, pp. 2990-2995, XP056010751.

(Continued)

*Primary Examiner* — Harry K Liu
(74) *Attorney, Agent, or Firm* — Norton Rose Fulbright US LLP; Gerard Messina (57) ABSTRACT Computer-implemented data structure (UERE database) including at least one location-dependent UERE value, the at least one UERE value being ascertained with the aid of a method for ascertaining a location-dependent or time-dependent UERE value based on a measurement of the location accuracy or with the aid of a method for determining a location-dependent or time-dependent UERE value with the aid of a machine learning method.

12 Claims, 5 Drawing Sheets

(56) References Cited

U.S. PATENT DOCUMENTS

2020/0320870 A1* 10/2020 Yamamoto ............ G08G 1/056

FOREIGN PATENT DOCUMENTS

| WO | 02061450 A2 | 8/2002 |
| WO | 2011044672 A1 | 4/2011 |

OTHER PUBLICATIONS

J.W. Betz, "Error Sources and Error Characterization", Engineering Satellite-Based Navigation and Timing: Global Navigation Satellite Systems, Signals, and Receivers, the Institute of Electrical and Electronics Engineers, John Wiley & Sons, 2016, pp. 139-155.
Johnson et al., "ION GNSS 2012" In USCG NDGPS Accuracy and Spatial Decorrelation Assessment, 2012, 11 pages.
D. Schmidt, "Fehleranalyse Und Datenfusion Von Satellitennavigations—Und Fahrdynamiksensorsignalen [Error Analysis and Data Fusion of Satellite Navigation—and Vehicle Dynamics Sensor Signals]," Technische Universität Darmstadt, Darmstadt, 2009, 180 pages.

* cited by examiner

METHOD FOR ASCERTAINING A UERE, METHOD FOR DETERMINING A UERE, COMPUTER-IMPLEMENTED DATA STRUCTURE, USE, DEVICE AND COMPUTER-IMPLEMENTED PROGRAM

CROSS REFERENCE

The present application claims the benefit under 35 U.S.C. § 119 of German Application No. DE 102018222643.1 filed on Dec. 20, 2018, which is expressly incorporated herein by reference in its entirety.

FIELD

The present invention relates to a method for ascertaining a UERE, a method for determining a UERE, a computer-implemented data structure, a use, a device and a computer-implemented program.

BACKGROUND INFORMATION

In J. W. Betz, "Error Sources and Error Characterization" in Engineering Satellite-Based Navigation and Timing: Global Navigation Satellite Systems, Signals, and Receivers, The Institute of Electrical and Electronics Engineers, John Wiley & Sons, 2016, p. 139ff, it is described that satellite navigation systems are extremely precise as compared to other position sources and time sources that are available over large parts of the earth, but their measurements still exhibit errors. One important aspect of the development of navigation systems is understanding the error sources, quantifying the error factors and estimating the impacts on the PVT accuracy. The paper initially describes the error sources, presents the various error categories and describes the dominating influencing factors for the distance error. The paper further describes a simple and general model for converting the distance error into errors when estimating position and time. It shows how the geometry of the satellites impacts these errors, and summarizes many different error metrics with their correlations. In addition, the paper describes the resulting position errors and time errors and introduces differential navigation in order to significantly reduce errors. Finally, several other error sources are described.

In G. & O. C. & W. M. & S. P. & P. A. & J. H. R. & B. C. A. Johnson, "ION GNSS 2012" in USCG NDGPS Accuracy and Spatial Decorrelation Assessment, 2012, it is described that auxiliary scalars for approximating the location accuracy averaged across the world may be provided for each GNSS receiving device.

In D. Schmidt, "Fehleranalyse und Datenfusion von Satellitennavigations—und Fahrdynamiksensorsignalen [Error Analysis and Data Fusion of Satellite Navigation—and Vehicle Dynamics Sensor Signals]," Technische Universität Darmstadt, Darmstadt, 2009, it is described that fusing vehicle dynamics sensors with GNSS data achieves an improved location accuracy.

UERE in the present case stands for User Equivalent Range Error (UERE). A UERE value is typically understood in the field of position determination, more precisely in the field of satellite-assisted position determination, for example, with the aid of a global navigation satellite system (GNSS), to mean a scalar value, which is established as a function of the position determination device used, more precisely, receiver device, based on different errors on the device side. The error in the respective device is typically set to a value.

The UERE value has a direct influence on the location accuracy $\Delta \bar{r}$ of a position determination. The location accuracy $\Delta \bar{r}$ is usually approximated with the aid of the following term.

$$\Delta \bar{r} = DOP \cdot UERE$$

DOP in this case stands for a morphology factor, which is calculated from the position matrix of the visible satellites of the GNSS and has no unit.

SUMMARY

The present invention provides a method for ascertaining a location-dependent UERE value for determining a position. The method includes the steps:
detecting a signal representing a position,
comparing the represented position with a reference position,
ascertaining the UERE value as a function of the comparison.

A position in the present case may be understood to mean a location on earth. This location may be specified in the form of location coordinates or geographical coordinates or the like. A signal representing a position in the present case may be understood to mean a signal of a positioning determination system such as, for example, a GNSS or a triangulation system.

A reference position in the present case may be understood to mean a position that corresponds to the actual position, whose location coordinates are to be determined, or that approximates a predetermined small deviation.

Such a reference position may be provided by a high-accuracy map, by an alternative position determination system or by a reference position determination system.

The method has the advantage that it is now possible to create a location-dependent or a time-dependent UERE value instead of a global standard device-dependent UERE value. The present invention of the method is accordingly based on the finding that a significantly improved determination of the location accuracy of a detected position is easily possible with the aid of such a UERE value. As a result, it is possible to quickly and simply establish a weighting, with which the detected position is taken into consideration in a method for determining a position, which is based on a fusion of multiple types of position determination.

According to one specific embodiment of the method according to the present invention, the signal in the step of detecting is a signal of a GNSS receiver.

A GNSS receiver in the present case may be understood to mean a device, which is configured to receive a signal of a GNSS and to convert it into a signal representing a position. The presently best known GNSSs include the global positioning system (NAVSTAR GPS or GPS), the global satellite navigation system (GLONASS), Galileo and Beidou.

Different location accuracies result as a function of location and of time, in particular in the position determination with the aid of GNSS. The greatest influencing factors include the location-dependent error through multipath reception (multipath error) as well as the time-dependent or location-dependent visibility (line of site or LOF) of the GNSS navigation satellites.

According to one specific embodiment according to the present invention, the method includes the additional step of detecting a reference position. In the step, a reference signal representing the reference position is detected. Accordingly, in the step of comparing, the reference position is the detected represented reference position.

According to this specific embodiment, the reference signal is not present already when the signal for ascertaining the UERE is detected, but is also detected in parallel thereto. This specific embodiment has the advantage that a location-dependent or time-dependent UERE may be ascertained, even if no reference information is yet available. As a result, it is possible to quickly ascertain location-dependent or time-dependent UEREs for large areas.

According to one specific embodiment of the method according to the present invention, the particular UERE value is assigned a piece of location-dependent geometry and characteristics information (building heights, building shapes, mountains, trees, etc.) or a piece of zone-dependent information (weather, temperature, etc.) or a piece of time of day-dependent information (satellite positions) or the degree of latitude.

Pieces of geometry and characteristics information about, for example, building heights, building shapes, mountains, trees, etc., in particular, offer valuable indications of location-dependent factors that may have an influence on location accuracy. Thus, particular building heights or building shapes may result in an increased multipath propagation of the position signals of the GNSS navigation satellites. Mountains or trees may also result in an impairment of the visibility of GNSS navigation satellites.

Pieces of zone-dependent or time-dependent information, such as weather, temperature, etc. also offer valuable indications regarding factors that may influence the location accuracy.

In this respect, pieces of time of day-dependent information such as, for example, satellite positions may have an influence on the location accuracy, since a different DOP value occurs depending on the visibility of the satellites.

Combined, the aforementioned additional pieces of information supplement and expand the ascertained UERE value. These additional pieces of information may further be drawn upon in order to recognize patterns that result in a changed UERE value. Thus, UERE values may be determined based on the pieces of information, without these pieces of information having been ascertained by a detection, i.e., measurement on site.

This leads to an additional aspect of the present invention. This additional aspect of the present invention is a method for determining a UERE value for determining a position. The method includes the steps:

Determining the UERE value with the aid of a machine learning method. In this case, the machine learning method has been trained as a function of at least one previously known UERE value. In addition, the at least one UERE value has been ascertained with the aid of a method for ascertaining a UERE value according to the present invention.

A machine learning method in the present case is understood to mean a method for artificially generating knowledge from experience. These methods are based on the finding that patterns acquired from examples (i.e., from known pieces of information) are generalizable and, as a result, the acquired patterns are able to be recognized in unknown new data. In this way, artificial knowledge results from the unknown new data.

This aspect of the present invention is based on the finding that the UERE value is among other things a function of external factors such as, for example, pieces of location-dependent geometry and characteristics information (building heights, building shapes, mountains, trees, etc.) or of pieces of zone-dependent information (weather, temperature, etc.) or of pieces of time of day-dependent information (satellite positions) or of the degree of latitude.

This dependency of the UERE value on the additional pieces of information may be ascertained with the aid of machine learning methods.

Thus, correspondingly trained machine learning methods may infer a location-dependent or time-dependent UERE value based on the additional pieces of information.

According to one specific embodiment of the method according to this aspect of the present invention, the machine learning method has been trained also as a function of the location-dependent geometry and characteristics information (building height, building shapes, mountains, trees, etc.) and/or as a function of zone-dependent information (weather, temperature, etc.) and/or as a function of time of day-dependent information and/or as a function of the degree of latitude assigned the UERE value.

Another aspect of the present invention is a computer-implemented data structure including at least one location-dependent UERE value. The UERE value in this case may be ascertained with the aid of one specific embodiment of the method for ascertaining a UERE value according to the present invention or is determined with the aid of one specific embodiment for determining a UERE value according to the present invention.

Another aspect of the present invention is the use of a computer-implemented data structure according to one aspect of the present invention for determining a position, including the step:

Taking into consideration a piece of information representing a position as a function of the UERE value of the computer-implemented data structure assigned this information.

According to this aspect, a method based on the fusion of differently ascertained pieces of position information may use the now more accurate location-dependent UERE value in order to properly weight the pieces of position information corresponding to the UERE value during fusion.

A piece of position information then corresponds to a UERE value if the position information is provided by a device that has been assigned the UERE value for the provided position information. Compared to known uses, according to the present invention no longer is only a UERE value present for the device, but the UERE value is also location-dependent and, if necessary, time-dependent.

Another aspect of the present invention is a device for determining a position. The device is configured for using a computer-implemented data structure according to one aspect of the present invention. When determining a position, the device uses a UERE value of the data structure. For this purpose, the device includes corresponding means in order to carry out each step of the method. These means may be appropriately designed or configured interfaces for inputting, outputting, processing units (processors, microprocessors, ASIC and the like), and memory units (RAM, ROM, etc.).

Another aspect of the present invention is a computer-implemented program, which is configured so as to carry out all steps of one specific embodiment of the method for ascertaining a UERE value according to the present invention or of one specific embodiment of the method for determining a UERE value according to the present invention.

BRIEF DESCRIPTION OF THE DRAWINGS

Additional features and advantages of the aspects of the present invention are described below based on specific embodiments with reference to the figures.

DETAILED DESCRIPTION OF EXAMPLE EMBODIMENTS

Figure 1A:
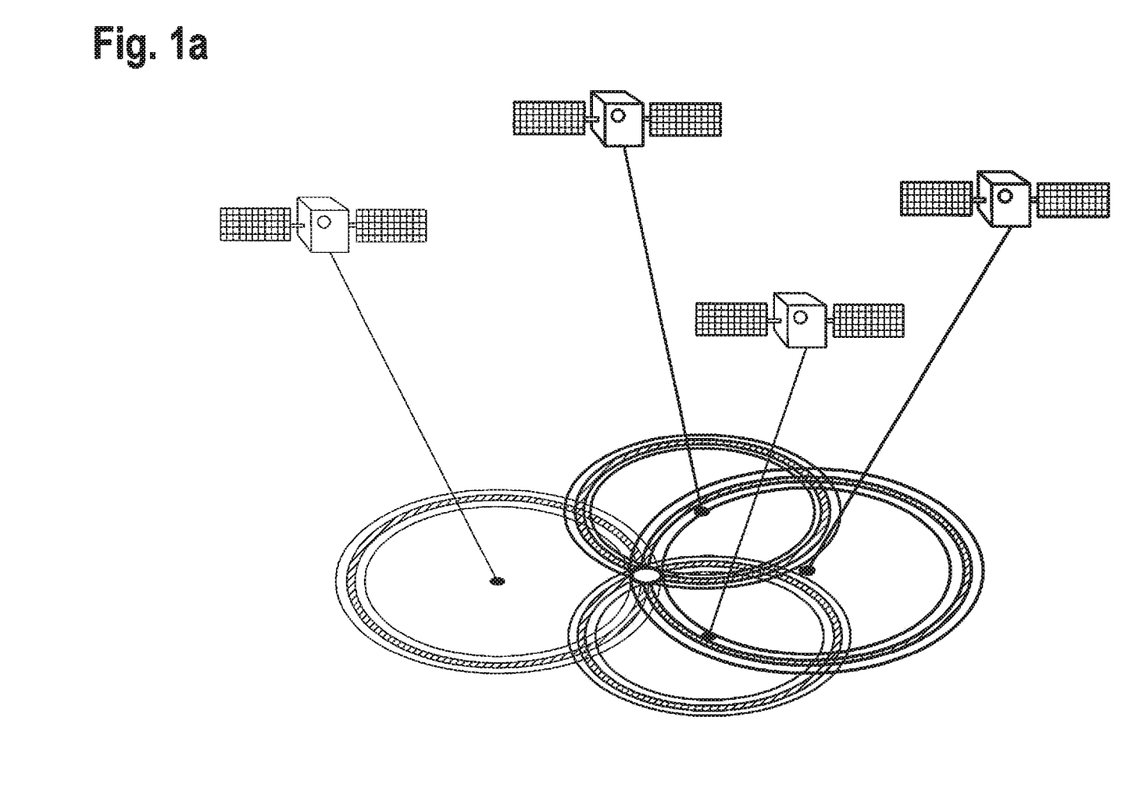
FIG. 1a schematically shows a representation of a satellite constellation for an advantageous DOP.

FIG. 1a schematically shows a representation of a satellite constellation for an advantageous DOP. An advantageous DOP is, among other things, achieved if the GNSS signals of the navigation satellites used provide a high resolution. This may be achieved, for example, by the navigation satellites used being situated widely distributed over the area visible to the receiving device.

Figure 1B:
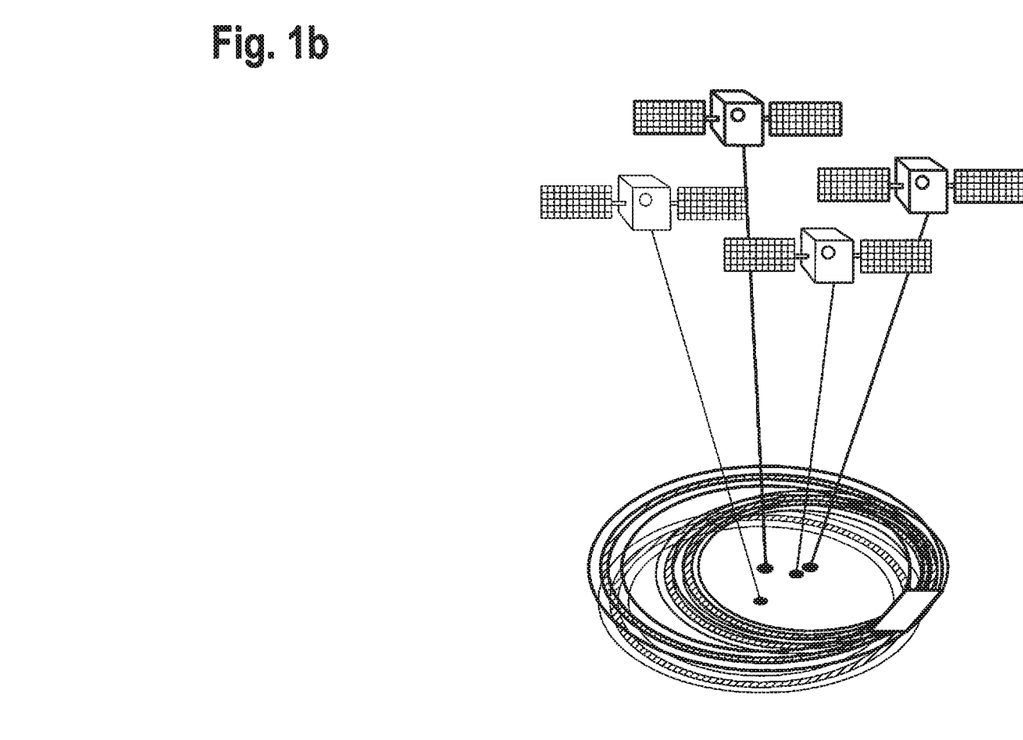
FIG. 1b schematically shows a representation of a satellite constellation for a disadvantageous DOP.

FIG. 1b schematically shows a representation of a satellite constellation for a disadvantageous DOP. A disadvantageous DOP is, among other things, achieved if the GNSS signals of the navigation satellites used provide a lower resolution. This may be the case, for example, if the navigation satellites are close together, so that their respective dispersion radii for position determination result in an overdetermined value and do not result in one point.

Figure 2:
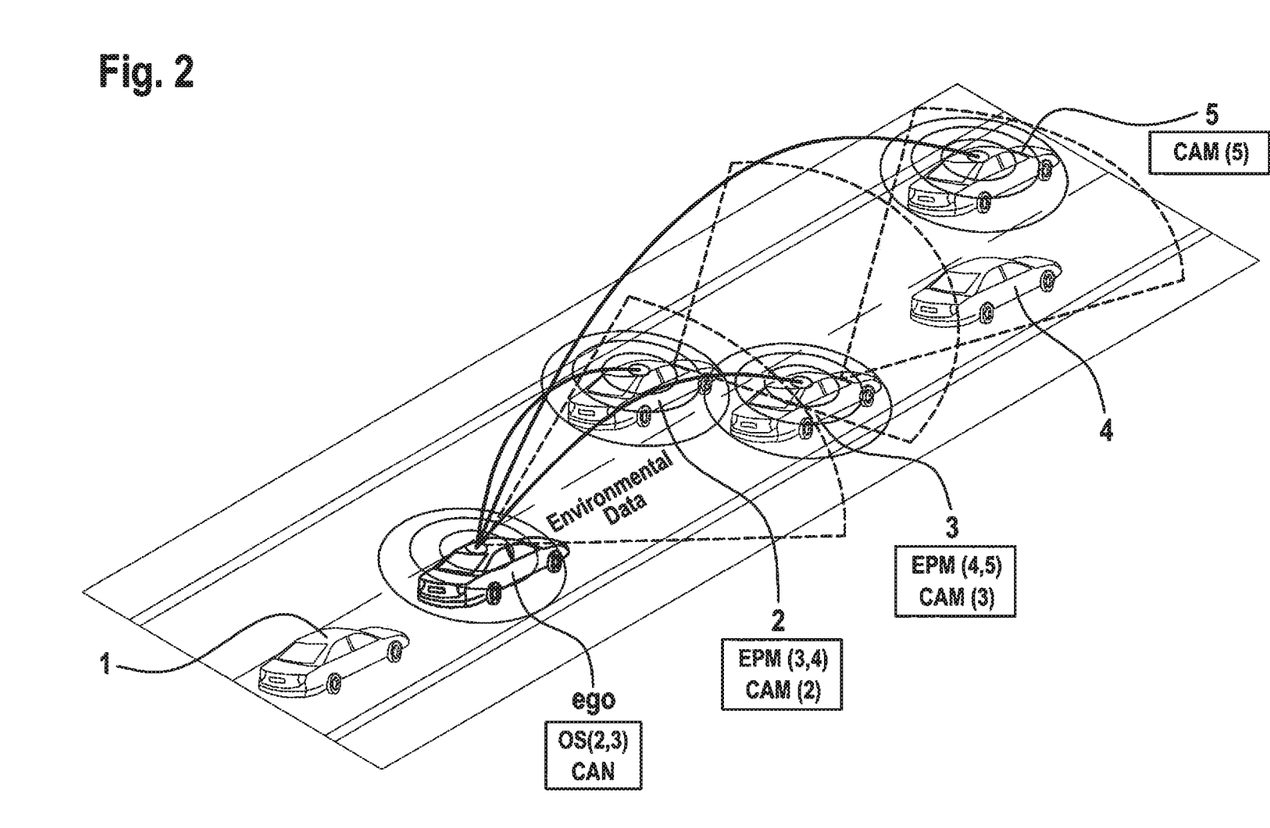
FIG. 2 schematically shows a representation of a situation of a position determination with position information of various sources.

FIG. 2 schematically shows a representation of a situation of a position determination with position information of various sources. The situation depicted is selected as exemplary for one area of application of the present invention. In the situation depicted, the ego vehicle receives ego position data of an additional vehicle 3 via its own onboard sensor system (OS), via a cooperative awareness message (CAM (3)) of first vehicle 3 itself and via an environment perception message (EPM (3, 4)), also called cooperative perception message (CPM). Thus, at least three different devices for satellite-assisted position determination are involved. The relative contribution of the respective position determinations is to be determined accordingly.

According to the present invention, each position determination has a location-dependent or time-dependent UERE. The respective UERE in this case may be provided by the respective devices for satellite-assisted position determination. In this case a corresponding database may be reserved in the respective device. It is equally conceivable that the respective UERE values are provided via a cloud service. In the event of an interrupted cloud service, the respectively affected devices may resort to a predefined fixed UERE value as a fallback solution.

A cloud service is useful among other reasons since nearly every device for satellite-assisted position determination includes a radio-based data access (for example, to the Internet). This data access is typically used for obtaining the ephemerides of the satellites during a cold start, in order in this way to accelerate the start of the meaningful position determination.

Since the UERE values are location-dependent and time-dependent scalars, their provision via a suitable radio-based data access involves no significant additional effort.

In the scenario depicted, the task for the ego vehicle is now to fuse the respective pieces of position information with respect to additional vehicle 3, in order to thus approximate as exactly as possible the likely actual position of additional vehicle 3.

For this purpose, the UERE value according to the present invention is useful. The value reflects a direct dependency on the location accuracy. A weighting of the position information may be undertaken during the fusion as a function of this value of the respective piece of position information.

For the position determinations in the ego vehicle ego of other vehicles 2, 3, 4, it is possible to select the appropriate approaches for taking into consideration the pieces of position information with the aid of car-to-car messages EPM (3, 4), CAM (2), EPM (4, 5), CAM (3), CAM (5).

The numbers in parentheses after the respective message type CAM or EPM indicate from which vehicle the respective message includes a position determination.

Figure 3A:
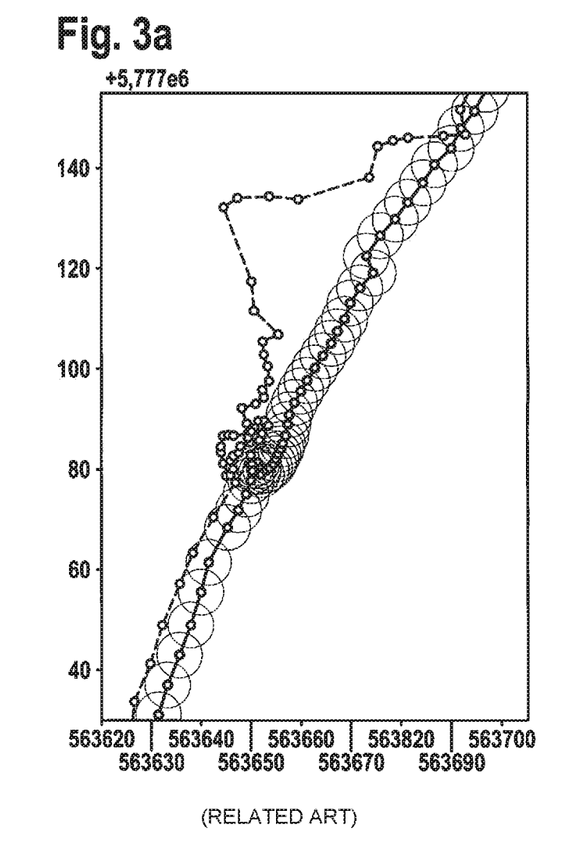
FIG. 3a schematically shows a representation of detected positions of a track as compared to a reference track having a fixed UERE value according to the related art.
Figure 3B:
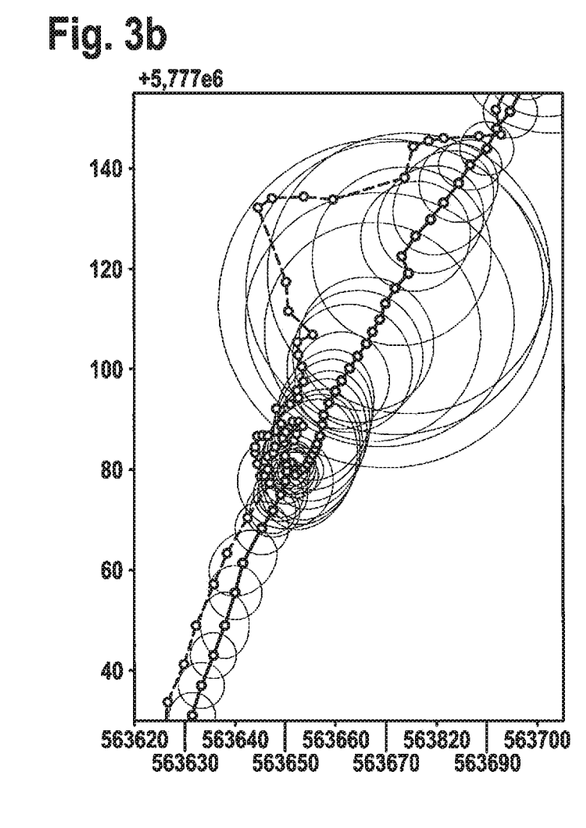
FIG. 3b schematically shows a representation of detected positions of a track as compared to a reference track having a location-dependent UERE value according to the present invention.

FIGS. 3a, 3b represent in a graph, which includes on its y-axis location coordinates in the form of degrees of longitude and latitude, the results of a test measurement (green and dashed) as compared to a reference measurement (red and solid). The points in this case represent the respective measuring points and reference points. The respectively used UERE values which indicate a dispersion of the measurement, are indicated as circles around the reference points.

FIG. 3a depicts the situation in which a fixed UERE value is used. It becomes clear that the actual measured positions at many points are clearly outside the expected measurement dispersion. Thus, starting from the UERE values, a clearly more precise measurement is assumed than has actually taken place.

FIG. 3b depicts the situation in which a location-dependent or time-dependent UERE value according to the present invention is used. It becomes clear that now the actual measurements in most all of the cases are located within the expected measurement dispersion according to the respective UERE value. Thus, the respective location accuracy may now be taken into consideration for the weighting of the GNSS position determination as a function of the location-dependent or time-dependent UERE value according to the present invention during the fusion of the GNSS position determination with alternative position determinations.

Figure 4:
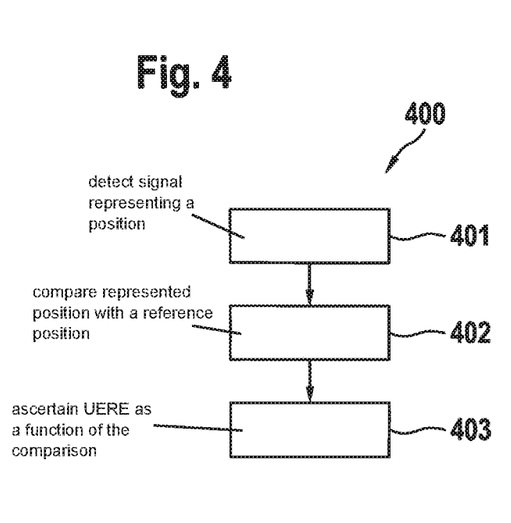
FIG. 4 shows a flow chart of one specific embodiment of a method according to the present invention for ascertaining a UERE value.

FIG. 4 shows a flow chart of one specific embodiment of a method 400 according to the present invention.

In step 401, a signal representing a position is detected with the aid of a unit for detecting a position signal. Such a unit may, for example, be a GNSS receiving device for receiving GNSS signals of GNSS navigation satellite. It may also involve a device for wireless communication, via which a message containing a piece of position information or representing a piece of position information may be received.

In step 402, the represented position is compared with a reference position. The comparison in this case may take place using a corresponding means for comparing, for example, a processor, microprocessor or application-specific integrated circuit (ASIC). The reference position may be present in a suitable data memory, for example, in a RAM or ROM or may be provided via a radio-based cloud service.

In step 403, a UERE value is ascertained as a function of the comparison. To ascertain the UERE value, the value may be estimated with the aid of the following formula:

$$UERE(\sigma) = \frac{\sqrt{(\vec{r}_{ref} - \vec{r}_{test})^T \Sigma^{-1} (\vec{r}_{ref} - \vec{r}_{test})}}{\sigma}$$

$\Sigma$ being the covariance matrix derived from the position of the GNSS navigation satellite used for the position determination.

In one simple variant, it is also possible to utilize a location-dependent or time-dependent UERE heaviside function.

Figure 5:
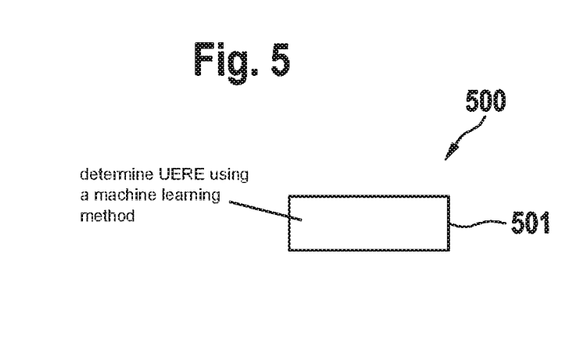
FIG. 5 shows a flow chart of one specific embodiment of a method according to the present invention for determining a UERE value.

FIG. 5 shows a flow chart of one specific embodiment of a method according to the present invention.

In step 501, the UERE value is determined with the aid of a machine learning method. The machine learning method in this case was trained as a function of at least one previously known UERE value. The at least one UERE value may have been ascertained, for example, with the aid of a method for ascertaining a UERE value according to the first aspect of the present invention.

What is claimed is:

1. A method for providing, for a single first position determining device, a plurality of error tolerance values that each quantifies a respective expected error for position determinations when performed by the single first position determining device, the plurality of error tolerance values corresponding to at least one of different respective locations and different respective times, the error tolerance values being weighting factors by which to weight the position determinations of the single first position determining device relative to position determinations by one or more other position determining devices at the at least one of the different respective locations and the different respective times, the method comprising the following steps:
over time, the single first position determining device determining a first plurality of positions;
for each of the first plurality of positions determined by the single first position determining device:
a processor comparing the respective position determined by the single first position determining device to a respective corresponding reference position to obtain a respective difference; and
the processor obtaining a respective one of plurality error tolerance values as a quantification of the obtained respective difference;
wherein either or both of the following two features (a) and (b):
(a) the respective corresponding reference positions are each obtained, in parallel to the determination of the respective one of the first plurality of positions to which the respective reference position corresponds, by another position determining device; and (b) the method further comprises the processor executing a machine learning program into which are input the respective ones of the plurality of error tolerance values together with respective environmental data characterizing one or more environmental features determined to have been present when the respective positions determined by the single first position determining device were obtained, the processor thereby determining with the machine learning program additional ones of the error tolerance values based on one or more environmental features detected to be present at at least one of respective locations and respective times of the additional ones of the error tolerance values.

2. The method as recited in claim 1, wherein the single first position determining device is a GNSS device.

3. The method as recited in claim 1, wherein the method further comprises the processor executing the machine learning program into which are input the respective ones of the plurality of error tolerance values together with the respective environmental data characterizing the one or more environmental features determined to have been present when the respective positions determined by the single first position determining device were obtained, the processor thereby determining with the machine learning program the additional ones of the error tolerance values based on the one or more environmental features detected to be present at the at least one of the respective locations and the respective times of the additional ones of the error tolerance values.

4. The method as recited in claim 3, wherein the environmental data includes: a piece of location-dependent geometry and characteristics information and/or a piece of zone-dependent information and/or a piece of time of day-dependent information and/or a degree of latitude.

5. The method as recited in claim 4, wherein the piece of location-dependent geometry and characteristics information include information regarding building heights and/or building shapes and/or mountains and/or trees.

6. The method as recited in claim 4, wherein the piece of zone dependent information includes information regarding weather and/or temperature.

7. The method as recited in claim 4, wherein the piece of time of day-dependent information includes satellite positions.

8. The method as recited in claim 1, wherein the respective corresponding reference positions are each obtained, in parallel to the determination of the respective one of the first plurality of positions to which the respective reference position corresponds, by the other position determining device.

9. A method for identifying a position of an object, the method comprising:
a plurality of devices each determining a respective value of the position of the object;
based on at least one of an area in which the object is located and a time at which the position is being determined, a processor obtaining for each of the plurality of devices a respective error tolerance value that is at least one of area dependent by being predefined as varying for different predefined areas and time dependent by being predefined for varying for different predefined times; and
the processor determining a result value of the position of the object by weighting the respective values of the plurality of devices by the respective error tolerance values.

10. A method for identifying a position of an object, the method comprising:
- a plurality of devices each determining a respective value of the position of the object;
- based on at least one of an area in which the object is located and a time at which the position is being determined, a processor obtaining for each of the plurality of devices a respective error tolerance value that is at least one of area dependent by being predefined as varying for different predefined areas and time dependent by being predefined for varying for different predefined times; and
- the processor determining a result value of the position of the object by weighting the respective values of the plurality of devices by the respective error tolerance values;
- wherein the error tolerance values are provided according to the method of claim 1.

11. A device for identifying a position of an object comprising:
- a sensor configured to detect a first value of the position of the object;
- a communication device configured to obtain one or more other values of the position of the object obtained using one or more respective external position determination devices; and
- a processor, wherein the processor is configured to:
  - based on at least one of an area in which the object is located and a time at which the position is being determined, obtain for each of the sensor and the one or more respective external position determination devices a respective error tolerance value that is at least one of area dependent by being predefined as varying for different predefined areas and time dependent by being predefined for varying for different predefined times; and
  - determine a result value of the position of the object by weighting the respective values of the plurality of devices by the respective error tolerance values.

12. A non-transitory computer-readable medium on which are stored instructions that are executable by a processor and that, when executed by the processor, causes the processor to perform a method for providing, for a single first position determining device, a plurality of error tolerance values that each quantifies a respective expected error for position determinations when performed by the single first position determining device, the plurality of error tolerance values corresponding to at least one of different respective locations and different respective times, the error tolerance values being weighting factors by which to weight the position determinations of the single first position determining device relative to position determinations by one or more other position determining devices at the at least one of the different respective locations and the different respective times, the method comprising the following steps:
- over time, using the single first position determining device to determine a first plurality of positions;
- for each of the first plurality of positions determined by the single first position determining device:
  - compare the respective position determined by the single first position determining device to a respective corresponding reference position to obtain a respective difference; and
  - obtain a respective one of plurality error tolerance values as a quantification of the obtained respective difference;
- wherein either or both of the following two features (a) and (b):
  - (a) the respective corresponding reference positions are each obtained, in parallel to the determination of the respective one of the first plurality of positions to which the respective reference position corresponds, by the processor using another position determining device; and
  - (b) the method further comprises the processor executing a machine learning program into which are input the respective ones of the plurality of error tolerance values together with respective environmental data characterizing one or more environmental features determined to have been present when the respective positions determined by the single first position determining device were obtained, the processor thereby determining with the machine learning program additional ones of the error tolerance values based on one or more environmental features detected to be present at at least one of respective locations and respective times of the additional ones of the error tolerance values.

* * * * *